Patented Mar. 3, 1925.

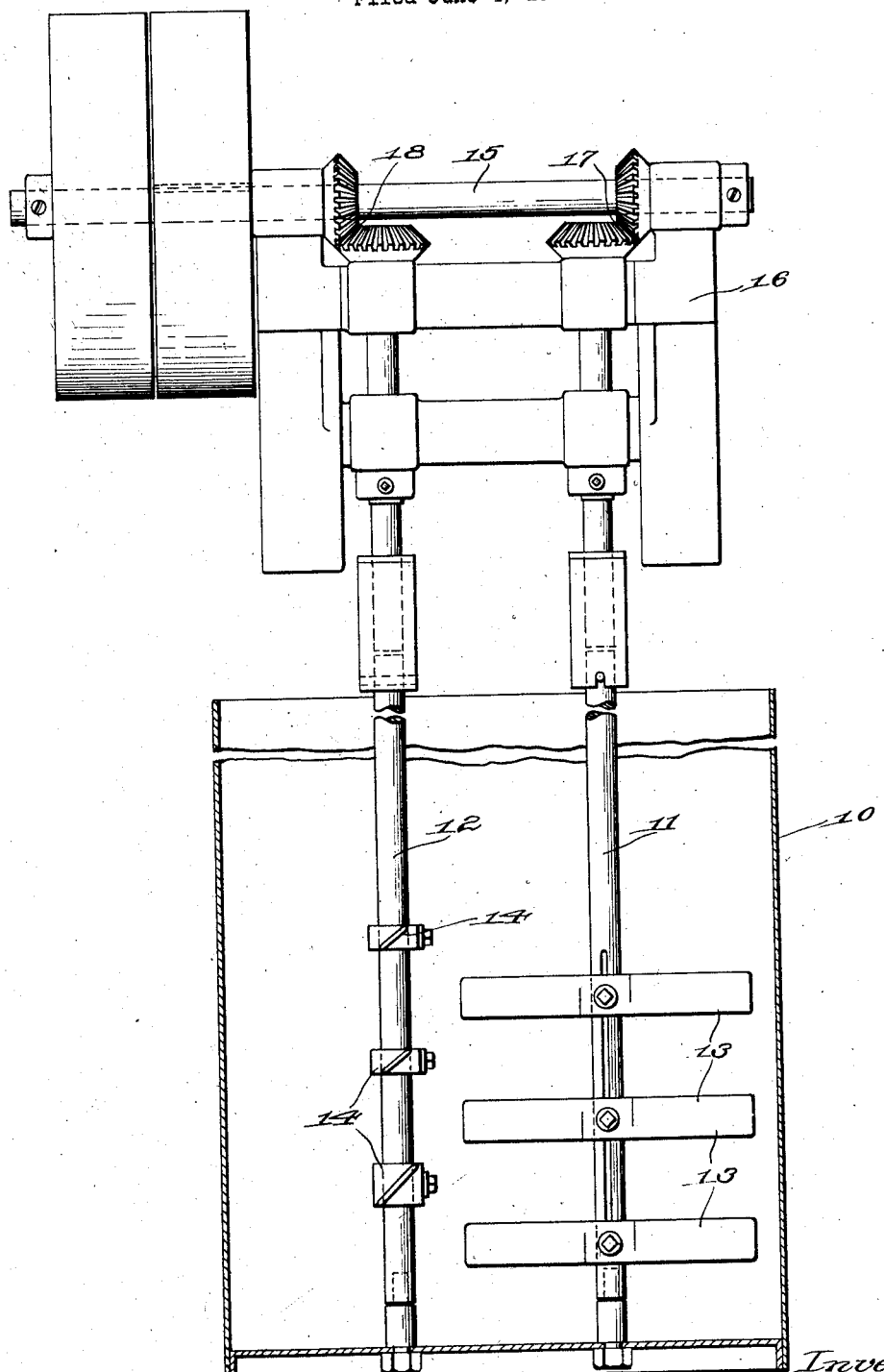

1,528,526

UNITED STATES PATENT OFFICE.

LUDWIG W. BUCKLEY, OF WEST SOMERVILLE, MASSACHUSETTS.

METHOD OF MAKING SYNTHETIC CHICLE COMPOUND.

Application filed June 4, 1921. Serial No. 475,154.

*To all whom it may concern:*

Be it known that I, LUDWIG W. BUCKLEY, a citizen of the United States, and resident of West Somerville, county of Middlesex, Commonwealth of Massachusetts, have invented an Improvement in Methods of Making Synthetic Chicle Compound, of which the following description, in connection with the accompanying drawings, is a specification, like characters on the drawings representing like parts in each of the several views.

This invention relates to the manufacture of compounds for chewing gum, and more particularly to an improved compound and method of making the same wherein a gum base is produced without the use of natural chicle that exhibits the live stretchable quality of chicle gum bases, and also is free from oxidization or deterioration for long periods. The invention comprises a mixture of pontianac, with gutta K or "white gutta percha", and with ordinary gutta percha, in relatively definite and predetermined proportions, and also includes a special treatment of these gums, particularly of the pontianac whereby these are purified and cleansed of foreign ingredients and rendered suitable for gum uses.

In accordance with my invention I cut up the pontianac into small pieces and place the same in a soaking tank covered with warm water, and allow the gum to soak in this about fifteen minutes. I then place the pontianac in a suitable washer machine which may be an ordinary rubber washer, but is preferably a washer specially designed for the present purposes wherein the gum is thoroughly macerated and mixed with the cleansing solution. Such a washer is shown in the drawing wherein the figure is a vertical section with the operative elements in elevation and with intermediate portions broken away. 10 indicates a tub or tank within which are mounted for rotation vertical shafts 11, 12 bearing blades or paddles 13, 14 respectively, these blades being arranged in alternate relation on the two shafts with the blades on one shaft extending between the blades on the other shaft. These shafts are connected so as to be driven in opposite directions by an operating device shown as a shaft 15 horizontally journaled in a framework 16 and driving the two shafts 11, 12 through oppositely placed bevel gear pairs 17, 18.

Assuming the amount of pontianac placed in the washer at fifty pounds I first wash the pontianac in a solution of hot water, about four gallons, to which is added one pint of saturated caustic soda solution. While I prefer to employ caustic soda for this purpose, other caustic alkali such as caustic potash may be employed, the solution in the case of caustic potash being correspondingly weaker. I operate the washer to agitate the pontianac mass in the presence of this hot solution about twelve minutes. I then drain off the hot washing solution, and wash the pontianac repeatedly with three applications of cold water, alternating with applications of hot water, the purpose of the intermediate cold water applications being to bring the gum back to a degree of coherency and stiffness so that it is properly acted on by the paddles or stirrer elements of the washer. I then take the pontianac out of the washer, place it on a table and cut it into small chunks where it is allowed to dry for about eight days. I attach special importance to the washing of the pontianac for a limited time in a caustic alkali solution as set forth and with a thorough agitation of the pontianac in the presence of such solution, but without boiling the same. This is for the reason that boiling the pontianac in a caustic alkali rapidly disintegrates and destroys the fibrous texture of the gum so that it loses its "live" elastic quality, which is a fatal objection, since in a synthetic chicle of the present type, it is the pontianac ingredient that is relied upon to impart the live, stretchable, quality to the gum base. I have found that agitation of the pontianac mass for a substantial interval in a solution at a temperature well below the boiling point is adequate to cleanse the gum of the oily and acid foreign matter contained therein, and the subsequent washings with hot and cold water alternately, complete the removal of these elements, and eliminate all traces of the caustic alkali. The gutta K is broken up into small pieces, melted in a steam jacketed kettle, and carefully strained. It may then be run into tubs and is ready for use. The gutta percha is placed in a rubber or chicle washer and is washed with three applications of hot and cold water alternately to remove the bark and other foreign matter. In mixing these ingredients I scale two hundred and eighty pounds of pontianac and place the same in a mixer with about eight gallons of hot water. Then thirty pounds of gutta percha are fed into the mixer and this is followed by four hundred pounds of strained gutta K. The mixer is allowed to operate until these ingredients become thoroughly mixed. The compound is then placed in pans and delivered into a screw press to remove the water. After removal from the press the compound is pressed out on to trays covered with starch. In the described compound, the gutta K or white gutta is the filler element, while the pontianac hardens or stiffens the product and imparts a "live" or elastic stretchable quality thereto. The gutta percha acts as a drier. It is to be understood that the proportions of ingredients herein set forth are to a certain extent illustrative and I do not desire to be limited precisely thereto. Also I do not desire to be limited to other details of the operation set forth. Thus while I refer to three alternate applications of hot and cold water in washing the pontianac, this reference is merely illustrative, and the gum may be treated with a greater number of applications of hot and cold water though I have found that at least the number named is desirable to thoroughly cleanse the gum.

Having described my invention, what I claim as new and desire to secure by Letters Patent is:

1. The herein described method which consists in purifying pontianac gum by thoroughly agitating the same for a substantial interval, in the presence of a caustic alkali solution at a relatively high temperature but substantially below the boiling point and then cleansing the gum by aqueous applications.

2. The herein described method which consists in purifying pontianac gum, and by washing the same with thorough agitation for a substantial interval in a solution composed of about four gallons of water, and one pint of saturated caustic soda solution to each fifty pounds of the gum at a relatively high temperature but substantially below the boiling point, and in cleansing the gum thereafter with repeated applications of hot and cold water alternately.

In testimony whereof, I have signed my name to this specification.

LUDWIG W. BUCKLEY.